US009181112B2

(12) United States Patent
Asada et al.

(10) Patent No.: US 9,181,112 B2
(45) Date of Patent: Nov. 10, 2015

(54) METHOD AND APPARATUS FOR TREATING SELENIUM-CONTAINING WATER

(75) Inventors: Hiroyuki Asada, Tokyo (JP); Yoshikazu Yatsu, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 694 days.

(21) Appl. No.: 13/483,723

(22) Filed: May 30, 2012

(65) Prior Publication Data
US 2012/0305489 A1 Dec. 6, 2012

(30) Foreign Application Priority Data

Jun. 3, 2011 (JP) ................. 2011-125316

(51) Int. Cl.
*C02F 1/46* (2006.01)
*C02F 1/58* (2006.01)
*C02F 1/68* (2006.01)
*C02F 1/70* (2006.01)
*C02F 1/72* (2006.01)
*C02F 1/467* (2006.01)
*C02F 1/461* (2006.01)
*C02F 1/66* (2006.01)
*C02F 101/10* (2006.01)
*C02F 101/14* (2006.01)

(52) U.S. Cl.
CPC ............ *C02F 1/4678* (2013.01); *C02F 1/4676* (2013.01); *C02F 1/68* (2013.01); *C02F 1/705* (2013.01); *C02F 1/46176* (2013.01); *C02F 1/66* (2013.01); *C02F 2101/106* (2013.01); *C02F 2101/108* (2013.01); *C02F 2101/14* (2013.01); *C02F 2209/02* (2013.01); *C02F 2209/06* (2013.01)

(58) Field of Classification Search
CPC ...... C02F 2101/106; C02F 1/705; C02F 1/42; C02F 1/46; C02F 1/46176; C02F 1/4678; C02F 1/58; C02F 1/62; C02F 1/66; C02F 1/68; C02F 1/685; C02F 1/686; C02F 1/687; C02F 1/70; C02F 9/00; C02F 2101/108; C02F 2101/14; C02F 2101/16; C02F 2209/02; C02F 2209/06; C02F 2103/18; C02F 1/72; C02F 1/725
USPC ............. 210/757, 175, 177, 182, 198.1, 202, 210/205, 263, 681, 683, 688, 752, 762, 763, 210/911, 912
See application file for complete search history.

(56) References Cited

U.S. PATENT DOCUMENTS 4,770,700 A * 9/1988 Bertha et al. .................... 75/714
5,053,142 A * 10/1991 Sorensen et al. ............. 210/742
(Continued)

FOREIGN PATENT DOCUMENTS

CN 1448522 A * 10/2003
JP S63-014883 A 1/1988
(Continued)

OTHER PUBLICATIONS

Japan Patent Office, "Office Action for JP 2011-125316," Apr. 14, 2015.

*Primary Examiner* — Joseph Drodge
(74) *Attorney, Agent, or Firm* — Manabu Kanesaka

(57) ABSTRACT

A method and an apparatus for treating coal gasification wastewater containing selenium and ions of a metal nobler than titanium eluted from a noble metal catalyst in a catalytic wet oxidation treatment using the noble metal catalyst, the method includes a pretreatment process removing the ions of the metal nobler than titanium and a selenium reduction process contacting the coal gasification wastewater with a mixture of metallic titanium and a simple metal baser than metallic titanium whereby a portion of the simple metal baser than metallic titanium is eluted, and the selenium in the coal gasification wastewater becomes reduced.

10 Claims, 1 Drawing Sheet

(56) References Cited

U.S. PATENT DOCUMENTS

| | | | |
|---|---|---|---|
| 5,057,220 A | * 10/1991 | Harada et al. | 210/605 |
| 5,135,654 A | * 8/1992 | Heskett | 210/638 |
| 2009/0294377 A1 | * 12/2009 | Gallot | 210/737 |
| 2010/0230350 A1 | * 9/2010 | Etou et al. | 210/633 |

FOREIGN PATENT DOCUMENTS

| | | |
|---|---|---|
| JP | S63-294986 A | 12/1988 |
| JP | 2008-030020 A | 2/2008 |
| JP | 2009-011915 A | 1/2009 |
| JP | 2010-221151 A | 10/2010 |

* cited by examiner

METHOD AND APPARATUS FOR TREATING SELENIUM-CONTAINING WATER

FIELD OF INVENTION

The present invention relates to a method and an apparatus for treating selenium-containing water containing coexisting substances and particularly relates to a method and an apparatus for stably and efficiently treating selenium-containing water containing ions of a metal which is nobler than titanium as a coexisting substance wherein the selenium-containing water is subjected to reduction treatment by contacting the selenium-containing water with a mixture of metallic titanium and a simple metal (simple substance of a metal) baser than titanium, whereby decrease of selenium-treating performance with time is prevented.

BACKGROUND OF INVENTION

The following method is known: a method in which selenium is treated in such a manner that selenium-containing water such as coal gasification wastewater is contacted with a mixture of metallic titanium particles and metallic aluminum particles, aluminum is eluted by lowering pH during contacting, and selenium in wastewater is removed by subjecting selenium therein to reduction treatment by local cell action (Patent Documents 1 and 2).

The following method has been proposed for treating coal gasification wastewater by comprehensively treating SS, fluoride, cyanide, ammonia, and COD components contained in wastewater together with selenium: a method in which fluorine in wastewater is removed by flocculation-settling treatment, cyanides are decomposed by wet oxidation or the like, COD components and ammonia are oxidatively decomposed by catalytic wet oxidation, and selenium is then subjected to reduction treatment by the above method (Patent Document 3).

[Patent Document 1] Japanese Patent Publication 2008-30020A

[Patent Document 2] Japanese Patent Publication 2009-11915A

[Patent Document 3] Japanese Patent Publication 2010-221151A

Studies performed by the inventors have revealed a problem that selenium-treating performance decreases with time while such a series of treatments as disclosed in Patent Document 3 are being performed. The investigation of the cause of the problem has suggested that noble metal ions are eluted from a noble metal catalyst used for the catalytic wet oxidation treatment of COD components and ammonia prior to the reduction treatment of selenium to act as an inhibitory agent.

Regarding this, Patent Document 1, which relates to the reduction treatment of selenium, discloses nothing about a decrease in treatment performance due to a coexisting substance in selenium-containing water. Patent Document 2 discloses that performance is recovered by activating metallic titanium with acid; however, a technique disclosed in Patent Document 2 is incapable of solving the above problem.

In Patent Document 3, a problem with the elution of the noble metal ions from the noble metal catalyst is not investigated.

OBJECT AND SUMMARY OF INVENTION

The present invention solves the above problems and has an object to provide a method and apparatus for stably and efficiently treating selenium-containing water containing ions of a metal which is nobler than titanium and which is a coexisting substance in such a manner that the selenium-containing water is subjected to reduction treatment by contacting the selenium-containing water with a mixture of metallic titanium and a simple metal baser than titanium and the decrease of selenium-treating performance with time is prevented.

The inventors have made intensive investigations to solve the problems. As a result, the inventors have found that when selenium-containing water containing ions of a metal which is nobler than titanium and which is a coexisting substance is subjected to reduction treatment by contacting the selenium-containing water with a mixture of metallic titanium and a simple metal baser than titanium (hereinafter, a metal nobler than titanium is referred to as "noble metal" and a metal baser than titanium is simply referred to as "base metal" in some cases), ions of the noble metal in the selenium-containing water are reduced on the surfaces of metallic titanium particles in the titanium/base metal mixture in the course of subjecting selenium to reduction treatment to form precipitates, which adhere to the surfaces of the metallic titanium particles, that is, the surfaces of the metallic titanium particles are plated with the noble metal and therefore surface regions of the metallic titanium particles that contribute to a reduction reaction are gradually narrowed, resulting in the decrease in efficiency of the reduction reaction. Thus, the noble metal ions are removed prior to the reduction treatment of selenium, whereby the problems can be solved in such a manner.

The present invention has been accomplished on the basis of the above finding and is summarized as below.

[1] A method for treating selenium-containing water, the water further containing ions of a metal nobler than titanium, the method comprising a selenium reducing process in which the selenium-containing water is contacted with a mixture of metallic titanium and a simple metal (simple substance of a metal) baser than metallic titanium whereby a portion of the baser simple metal is eluted, and the selenium in the selenium-containing water is reduced, wherein a pretreatment is conducted before the selenium reducing process so that the nobler metal ions are removed from the selenium-containing water.

[2] The method for treating selenium-containing water according to [1], wherein the baser metal is at least one selected from the group consisting of zinc, aluminum, and magnesium.

[3] The method for treating selenium-containing water according to [1], wherein the nobler metal ions are those eluted from a noble metal catalyst.

[4] The method for treating selenium-containing water according to [1], wherein in the pretreatment, the nobler metal ions are removed by being reduced by a metal baser than titanium.

[5] The method for treating selenium-containing water according to [4], wherein the pretreatment is performed under acidic condition.

[6] The method for treating selenium-containing water according to [1], wherein water obtained by the pretreatment is added with an acid and is then subjected to the selenium reduction process.

[7] An apparatus for treating selenium-containing water, the water further containing ions of a metal nobler than titanium, the apparatus comprising a reduction treatment means for reducing selenium by containing the selenium-containing water with a mixture of metallic titanium and a simple metal baser than metallic titanium whereby a portion of the baser simple metal is eluted and the selenium is reduced, wherein the apparatus further comprises a pretreatment means for removing the nobler metal ions from the selenium-containing water, and a means for introducing water treated by the pretreatment means to the reduction treatment means.

[8] The apparatus for treating selenium-containing water according to [7], wherein the baser metal is at least one selected from the group consisting of zinc, aluminum, and magnesium.

[9] The apparatus for treating selenium-containing water according to [7], wherein the nobler metal ions are those eluted from a noble metal catalyst.

[10] The apparatus for treating selenium-containing water according to [7], wherein the pretreatment means removes the nobler ions by reducing them by a metal baser than titanium.

[11] The apparatus for treating selenium-containing water according to [10], wherein the pretreatment is performed under acidic condition.

[12] The apparatus for treating selenium-containing water according to [7], further comprising a means for adding an acid to water which is treated with the pretreatment means and which is then introduced into the reduction treatment means.

ADVANTAGEOUS EFFECT OF INVENTION

According to the present invention, selenium-containing water containing ions of a metal which is nobler than titanium and which is a coexisting substance can be stably and efficiently treated in such a manner that the selenium-containing water is subjected to reduction treatment by contacting the selenium-containing water with a mixture of metallic titanium and a simple metal baser than titanium and the decrease of selenium-treating performance with time is prevented.

DESCRIPTION OF EMBODIMENTS

Figure 1:
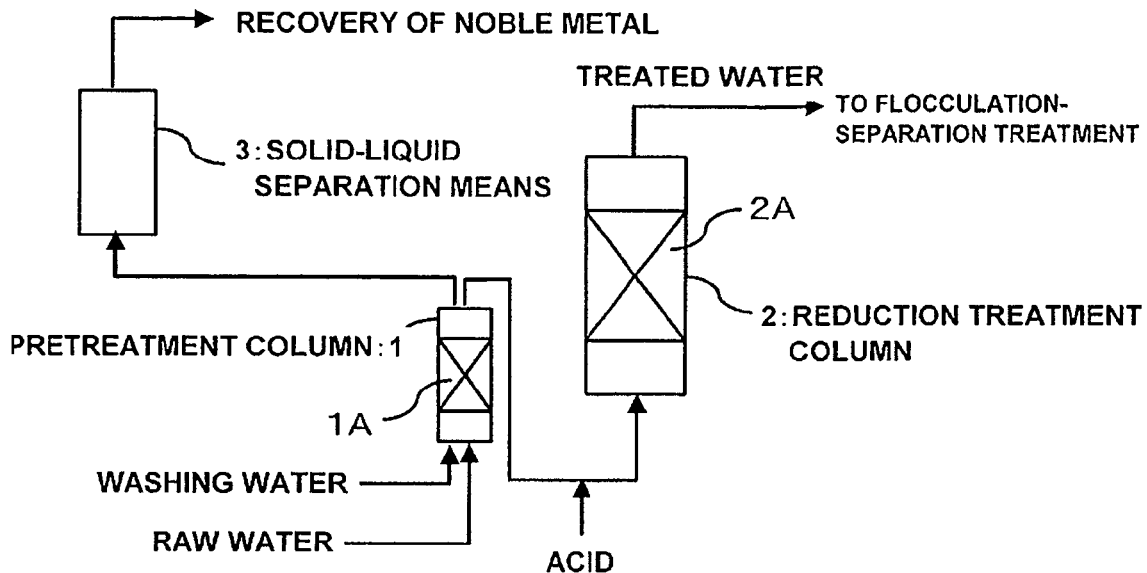
FIG. 1 is a flow diagram of an apparatus for treating selenium-containing water according to an embodiment of the present invention.

A method for treating selenium-containing water according to an embodiment of the present invention will now be described.

In the present invention, a pretreatment of removing ions of a noble metal in the selenium-containing water is performed prior to the reduction treatment of selenium.

The contact of the selenium-containing water with a titanium/base metal mixture allows ions of a base metal to be eluted in the selenium-containing water. Electrons generated during the elution of the base metal migrate to the surfaces of particles of metallic titanium and selenium, for example, hexavalent selenium in the selenium-containing water is subjected to reduction treatment on the surfaces of the metallic titanium particles in accordance with the following reaction formula:

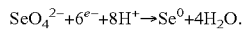
$SeO_4^{2-} + 6e^- + 8H^+ \rightarrow Se^0 + 4H_2O$.

In this case, if ions of a noble metal coexist in the selenium-containing water, the noble metal ions are reduced on the surfaces of the metallic titanium particles and therefore the noble metal is deposited on or adheres to the surfaces of the metallic titanium particles. This causes the surfaces of the metallic titanium particles that are fields of the reduction reaction of selenium to be coated with the noble metal; hence, the reduction treatment performance of selenium is decreased. The deposition of the noble metal on the surfaces of the metallic titanium particles or the adhesion of the noble metal thereto corresponds to plating and has a large influence on the reduction treatment performance of selenium if the concentration of the noble metal ions in the selenium-containing water is small, several milligrams per liter.

In the present invention, the noble metal ions, which cause the decrease in reduction treatment performance of selenium, are removed from the selenium-containing water prior to the reduction treatment of selenium, whereby the decrease in efficiency of reduction treatment with the titanium/base metal mixture is prevented.

<Selenium-Containing Water>

In the present invention, examples of the noble metal, to be treated, in the selenium-containing water include gold, platinum, indium, palladium, silver, mercury, copper, bismuth, antimony, lead, tin, nickel, cobalt, and cadmium. The selenium-containing water may contain only one of these metals or two or more of these metals.

In usual, examples of a source of the noble metal ions include steps of using noble metals in various factories and steps of treating water using noble metal catalysts like the catalytic wet oxidation treatment of the above-mentioned coal gasification wastewater. In particular, examples of the noble metal ions, which are contained in the selenium-containing water and are to be treated, include ions of noble metals, such as gold, platinum, and palladium, eluted from noble metal catalysts used in treatments, such as the catalytic wet oxidation treatment, using a noble metal catalyst.

In the present invention, the concentration of the noble metal ions in the selenium-containing water is low, usually 1 mg/L or less, and for example, about 50 μg/L to 500 μg/L in many cases. This is because the noble metal, which is expensive, is recovered in a step of using the noble metal prior to the release of wastewater and the amount of the noble metal ions eluted from a noble metal catalyst is usually slight.

On the other hand, selenium is contained in the selenium-containing water in the form of hexavalent selenium (for example, selenate ion), tetravalent selenium (for example, selenite ion), or the like. The concentration of selenium in the selenium-containing water is not particularly limited and is usually about 0.1 mg/L to 50 mg/L.

In the present invention, the selenium-containing water containing the noble metal ions to be treated, selenium-containing water containing noble metal ions eluted from a noble metal catalyst used for treatment like water obtained by treating the above-mentioned coal gasification wastewater by catalytic wet oxidation. In the present invention, selenium-containing water including metal refinery wastewater, petroleum refinery wastewater, glass plant wastewater, and mine wastewater can be appropriately treated in the case where noble metal ions are contained or a noble metal catalyst is present upstream.

<Pretreatment>

In the present invention, the pretreatment of removing the noble metal ions from the selenium-containing water is not particularly limited, may be a process capable of removing the noble metal ions, and is appropriately determined depending on the noble metal ions to be removed in consideration of industrial practical use.

When the noble metal ions are, for example, gold ions or platinum ions, the noble metal ions can be removed by activated carbon treatment. In order to remove gold ions or platinum ions with activated carbon such that the concentration of the gold or platinum ions is decreased to an extremely low level, several micrograms per liter, a large amount of activated carbon needs to be used when the activated carbon used is powdery. In the case of treatment with an activated carbon-packed tower, the activated carbon-packed tower needs to have a large size for the purpose of ensuring a sufficient contact time for adsorption, which is not practical.

Flocculation-settling treatment can be used as a technique for roughly removing the noble metal ions such that the concentration of the noble metal ions in treated water is decreased to about several milligrams per liter; however, it is difficult to remove the noble metal ions by flocculation-settling treatment such that the concentration of the noble metal ions therein is decreased to an extremely low level, several micrograms per liter.

A method using a reducing agent such as thiosulfuric acid or thiourea is incapable of removing the noble metal ions.

In contrast, reduction treatment using a base metal, that is, reduction treatment in which the base metal ions are eluted by contacting the selenium-containing water containing the noble metal ions with the base metal and in which the noble metal ions are precipitated into the noble metal can efficiently reduce and remove the noble metal ions in the selenium-containing water such that the concentration of the noble metal ions in the selenium-containing water to an extremely low level, several micrograms per liter.

The base metal used for the reduction treatment of the noble metal ions is not particularly limited and may be a metal baser than titanium. It is advantageous to use the same base metal as the base metal in the titanium/base metal mixture, which is used for the downstream reduction treatment of selenium, in terms of material procurement and inventory control.

Thus, one or more of zinc, aluminum, and magnesium can be used as the base metal. In particular, aluminum is preferably used. The form and size of the base metal may be the same as those of the base metal in the titanium/base metal mixture, which is used for the reduction treatment of selenium as described below.

A method for contacting the selenium-containing water containing the noble metal ions with the base metal in pretreatment is not particularly limited and may be, like a method for contacting the selenium-containing water containing the noble metal ions with the titanium/base metal mixture in reduction treatment below, a method using a pretreatment tank where the selenium-containing water containing the noble metal ions is introduced and is contacted with the base metal or a method in which the selenium-containing water containing the noble metal ions is fed through a packed tower filled with base metal particles.

The reduction treatment of the noble metal ions with the base metal is usually performed under acidic conditions with a pH of 1 to 4 and preferably a pH of 2.5 to 3 in terms of the elution efficiency of the base metal and the reduction treatment efficiency of the noble metal ions. Therefore, when the pH of the selenium-containing water containing the noble metal ions is high, the pH thereof is appropriately adjusted by the addition of an acid such as sulfuric acid or hydrochloric acid and the selenium-containing water is then subjected to reduction treatment.

The reduction treatment of the noble metal ions with the base metal is preferably performed at a temperature of 40° C. to 90° C. and particularly preferably 50° C. to 65° C. in terms of reduction treatment efficiency.

In the present invention, the concentration of the noble metal ions in the selenium-containing water is preferably decreased to 10 µg/L or less or an extremely low level, for example, 1 µg/L to 10 µg/L by such pretreatment for the purpose of securely maintaining the performance of the downstream reduction treatment of selenium.

In the case of subjecting the noble metal ions in the selenium-containing water to reduction treatment using the base metal as described above, the noble metal can be recovered in such a manner that the noble metal is stripped from the surface of the base metal used for reduction treatment by water-washing the base metal and water used for washing is subjected to solid-liquid separation.

<Reduction Treatment>

The selenium-containing water separated from the noble metal ions by the pretreatment is then subjected to reduction treatment.

The base metal in the titanium/base metal mixture used for the reduction treatment may be one of various metals baser than titanium and is preferably one that creates sludge which contains a hydroxide produced by pH adjustment after the elution of the base metal ions and which exhibits white. White sludge is more easily discarded than brown sludge or the like. Preferred examples of the base metal, which creates white sludge, include aluminum, zinc, and magnesium. In particular, aluminum is excellent in solubility and can be preferably used in the present invention. The base metal may be a simple metal or a mixture or alloy of two or more metals.

Metallic titanium and the base metal in the titanium/base metal mixture preferably have a large surface area and may be in the form of, for example, powder with a particle size of about 10 µm to 5 mm, particles, fibers, thin films (scaly substances), or the like. In the titanium/base metal mixture, metallic titanium and the base metal may be the same in form or size as each other or different in form or size from each other. Metallic titanium and the base metal may have different forms or sizes. Sponge titanium has a large specific surface area and therefore is preferably used as metallic titanium.

For the ratio of metallic titanium to the base metal in the titanium/base metal mixture, when the proportion of metallic titanium is large, the number of electrons which are generated during the elution of the base metal and which migrate to the surface of metallic titanium is increased and the amount of selenium reduced on the surface of metallic titanium is increased; hence, the reduction efficiency is increased. When the proportion of the base metal is excessively small, most of the electrons generated during the elution of the base metal are released from the surface of base metal and the number of electrons which migrate to the surface of metallic titanium to contribute to the reduction of selenium is small, which is inefficient. Thus, the mixing ratio (volume ratio) of metallic titanium to the base metal in the titanium/base metal mixture preferably ranges from 4 to 1/10 and more preferably 1/2 to 1/4.

A method for contacting pretreated water with the titanium/base metal mixture is not particularly limited and may use a reaction tank in which the pretreated water is introduced and is contacted with the titanium/base metal mixture or a reduction reactor in which the pretreated water is fed through a packed bed filled with the titanium/base metal mixture.

The reduction treatment is preferably performed under acidic conditions with a pH of 1 to 3 and particularly preferably 1.5 to 2 for the purpose of increasing the elution rate of the base metal. Pretreatment is also performed under acidic conditions with a pH of 1 to 4 and particularly preferably 2.5 to 3 as described above. Thus, the pretreated water is usually acidic and has a pH of about 2 to 5. In the present invention, a necessary amount of acid is used for pH adjustment in pretreatment and an acid such as sulfuric acid or hydrochloric acid is added to the pretreated water in the reduction treatment separately from the acid used, that is, acid is preferably used in two steps. In the case of using acid in one step, the pH in a prior stage needs to be low for the purpose of maintaining acidity in a subsequent stage. When the pH in the prior stage is excessively low, the base metal is excessively dissolved and therefore a large amount of a chemical agent is necessary.

Most of selenium, for example, hexavalent selenium in the selenium-containing water is reduced into zero-valent selenium by such reduction treatment to precipitate on the titanium/base metal mixture and is removed. The residual hexavalent selenium is reduced into, for example, tetravalent selenium, which is converted into a form likely to precipitate by flocculation treatment.

In the present invention, after the pretreated water is subjected to reduction treatment, reduction-treated water is preferably subjected to flocculation-separation treatment. Flocculation-separation treatment is performed in such a manner that the eluted base metal are the like are precipitated in the form of insoluble compounds such as hydroxides by adjusting the pH of reduction-treated water and precipitated metal compounds are subjected to solid-liquid separation.

The pH of the reduction-treated water is usually adjusted by adding an alkali such as sodium hydroxide, potassium hydroxide, or slaked lime to the reduction-treated water. When the base metal used in combination with metallic titanium is aluminum, the alkali is added to the reduction-treated water, whereby dissolved aluminum is precipitated in the form of aluminum hydroxide. In this case, the pH of the reduction-treated water is preferably adjusted to 5 to 8 by the addition of the alkali and it is inappropriate that the pH thereof is adjusted to 4 or less or 9 or more because aluminum hydroxide is dissolved. When the base metal used in combination with metallic titanium is zinc, zinc can be precipitated in the form of a hydroxide by adjusting the pH of the reduction-treated water to 9 to 10.

In the case of precipitating the metal compounds by pH adjustment as described above, solid-liquid separability can be increased by the addition of an organic or inorganic flocculant.

Solid-liquid separation is performed for the purpose of separating the precipitated metal compounds from water. Solid-liquid separation may use an arbitrary process usually used. Treated water and sludge containing insoluble metal compounds are separated from each other by settling, filtration, centrifugal separation, membrane separation, or the like.

The base metal eluted during reduction treatment is insolubilized by the pH adjustment of the reduction-treated water and is separated from the reduction-treated water by solid-liquid separation, whereby treated water free from the base metal is released. When the eluted base metal is precipitated in the form of, for example, an insoluble compound such as aluminum hydroxide, reduced low-valent selenium remaining in water is adsorbed on flocs of aluminum hydroxide and is precipitated because of coprecipitation.

In the case where fluorine and/or boron is present in the selenium-containing water, the use of aluminum as the base metal in the titanium/base metal mixture allows fluorine and/or boron to be precipitated because of coprecipitation during the precipitation of aluminum hydroxide by pH adjustment subsequent to reduction treatment and to be removed.

Selenium is removed from the selenium-containing water by reduction treatment as described above such that the concentration of selenium in the selenium-containing water is usually decreased to 0.1 mg/L or less.

<Treating Apparatus>

An apparatus for treating selenium-containing water according to an embodiment of the present invention will now be described with reference to FIG. 1, which shows the treating apparatus.

With reference to FIG. 1, the treating apparatus includes a pretreatment column 1 including a packed bed 1A which is filled with particles of a base metal and which serves as a pretreatment means and also includes a reduction treatment column 2 including a packed bed 2A which is filled with a titanium/base metal mixture and which serves as a selenium-reducing means. Reference numeral 3 represents a solid-liquid separation means.

Raw water (selenium-containing water containing ions of a noble metal) is fed to the pretreatment column 1 in an upflow mode, whereby the noble metal ions in the raw water are reduced and removed in the packed bed 1A, which is filled with the base metal particles. After being added with an acid, pretreated water flowing out of the pretreatment column 1 is fed to the reduction treatment column 2, whereby selenium is reduced and removed in the packed bed 2A, which is filled with the titanium/base metal mixture. Reduction-treated water flowing out of the reduction treatment column 2 is fed to a flocculation tank, which is not shown, and the solid-liquid separation means 3 in that order, whereby the reduction-treated water is subjected to flocculation-separation treatment as described above.

In the pretreatment column 1, the feed of the raw water is stopped periodically or as required and washing water is fed in an upflow mode, whereby a noble metal precipitated during reduction treatment is washed away. Washing wastewater is subjected to solid-liquid separation in the solid-liquid separation means 3, whereby the noble metal is collected.

In reduction treatment performed in the pretreatment column 1 and the reduction treatment column 2, hydrogen gas is generated and therefore water is fed thereto in an upflow mode.

Preferred conditions for treating selenium-containing water containing noble metal ions such as platinum ions in the treating apparatus are described below. The present invention is not limited to the conditions below.

<Pretreatment Column>

Feed of water: upflow.

Packed bed: aluminum (the same as aluminum in a titanium/aluminum mixture placed in the reduction treatment column).

Temperature of fed water: 40° C. to 90° C., preferably 50° C. to 65° C.

Feed rate of water (SV): $1\ h^{-1}$ to $50\ h^{-1}$, preferably $15\ h^{-1}$ to $30\ h^{-1}$.

pH of fed water: 1 to 4, preferably 2.5 to 3.

<Reduction Treatment Column>

Feed of water: upflow.

Packed bed: a mixture of aluminum and titanium (preferably sponge titanium).

(mixing ratio (volume ratio): Al/Ti=4 to 1/10, preferably 1/2 to 1/4)

Temperature of fed water: 40° C. to 90° C., preferably 50° C. to 65° C.

Feed rate of water (SV): $1\ h^{-1}$ to $20\ h^{-1}$, preferably $5\ h^{-1}$ to $10\ h^{-1}$.

Amount of added acid: $1\times10^{-3}$ N to $100\times10^{-3}$ N per 1 mg/L of selenium in pretreated water.

EXAMPLES

The present invention is further described below in detail with reference to an example and a comparative example. The present invention is not limited to the example and may be modified without departing from the scope of the present invention.

Example 1

Sulfuric acid was added to water containing 5.0 mg/L selenium (selenic acid), 500 μg/L platinum ions, and 50,000 mg/L sulfate ions, whereby raw water with a pH of 3 was prepared. The raw water was treated in an apparatus for treating selenium-containing water as shown in FIG. 1.

Specifications of each column were as described below.

Pretreatment column 1: a column, filled with 10 mL (17.4 g) of metallic aluminum particles having a size of 1.0 mm and a purity of 99.7%, having an inner diameter of 25 mm.

Reduction treatment column 2: a column, filled with 20 mL (28.8 g) of sponge titanium particles having a size of 2 to 4 mm and a purity of 99% or more and 10 mL (17.4 g) of metallic aluminum particles having a size of 1.0 mm and a purity of 99.7%, having an inner diameter of 25 mm.

While being heated to 65° C., the raw water was fed to the pretreatment column 1 at a flow rate of 100 mL/h (SV=10 h$^{-1}$). Sulfuric acid was quantitatively injected into outflow water from the pretreatment column 1 such that the concentration of sulfuric acid in the outflow water was 2,500 mg/L, whereby the pH thereof was adjusted. While being heated to 65° C., the outflow water was fed to the reduction treatment column 2 at a flow rate of 150 mL/h (SV=5 h$^{-1}$). The pH of the outflow water unfed to the reduction treatment column 2 was about 1.6 to 1.8.

The pH of outflow water from the reduction treatment column 2 was adjusted to about 7 by adding sodium hydroxide thereto, followed by reaction for 10 minutes. The resulting outflow water was filtered through No. 5A filter paper.

Obtained filtered water was analyzed for selenium concentration and aluminum concentration. Changes in selenium concentration and aluminum concentration with time were shown in FIG. 2.

The concentration of platinum ions in the outflow water from the pretreatment column 1 was determined to be 10 μg/L or less. Likewise, the concentration of platinum ions in water flowing into the reduction treatment column 2 was determined to be 0.1 μg/L or less.

Comparative Example 1

The pretreatment column 1 used in Example 1 was not used and the reduction treatment column 2 only was used. Sulfuric acid was quantitatively injected into water containing 5.0 mg/L selenium (selenic acid), 500 μg/L, platinum ions, and 50,000 mg/L sulfate ions such that the concentration of sulfuric acid in the water was 2,500 mg/L, whereby raw water adjusted in pH was prepared. While being heated to 65° C., the raw water was fed to the reduction treatment column 2 at a flow rate of 150 mL/h (SV=5 h$^{-1}$). The pH of the raw water unfed to the reduction treatment column 2 was about 1.6 to 1.8.

The pH of outflow water from the reduction treatment column 2 was adjusted to about 7 by adding sodium hydroxide thereto, followed by reaction for 10 minutes. The resulting outflow water was filtered through No. 5A filter paper.

Obtained filtered water was analyzed for selenium concentration and aluminum concentration. Changes in selenium concentration and aluminum concentration with time were shown in FIG. 2.

Figure 2:
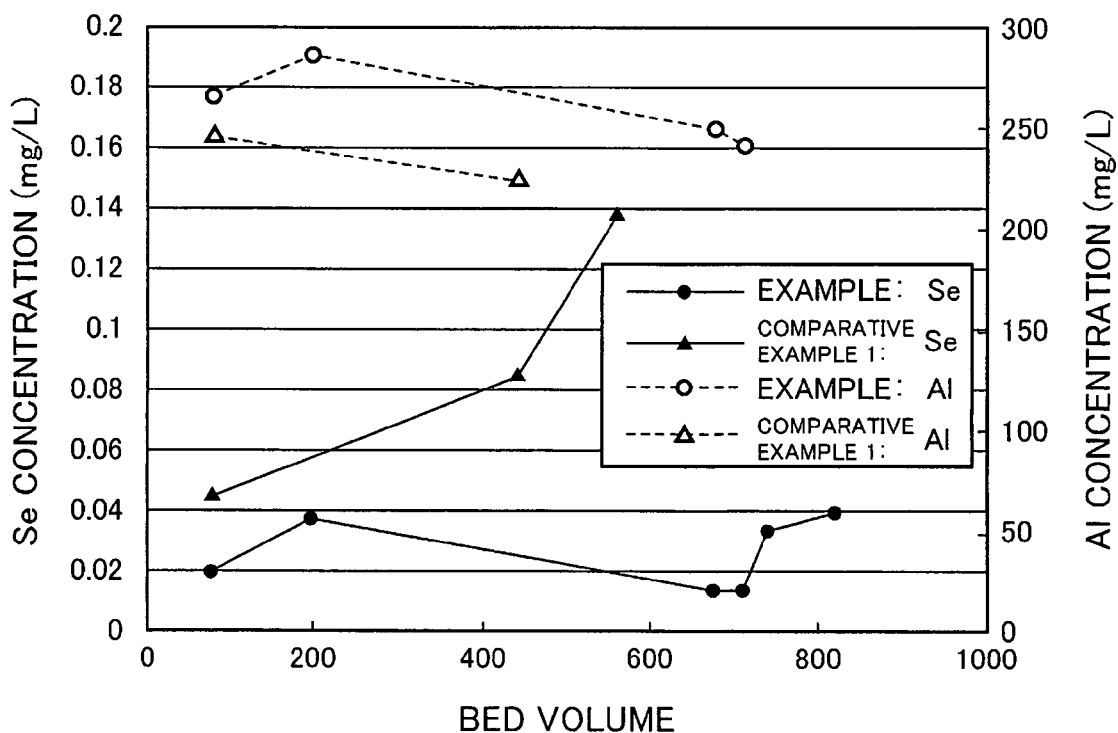
FIG. 2 is a graph showing changes in selenium concentration and aluminum concentration with time of treated water described in each of Example 1 and Comparative Example 1.

FIG. 2 shows that the decrease of reduction treatment performance is prevented and the reduction treatment of selenium can be stably performed over a long period of time in such a manner that platinum ions in selenium-containing water are removed in advance by pretreatment in accordance with the present invention.

In contrast, in Comparative Example 1, no platinum ions were removed and therefore there is a problem with remaining selenium due to the decrease of treatment performance with time.

Although the present invention has been described in detail based on specific embodiments, the person skilled in the art will understand that various modifications are possible within the spirit and the scope of the present invention.

The present application is based on a Japanese patent application filed in the Japanese Patent Office on Jun. 3, 2011 (Japanese Patent Application No. 2011-125316), the entire contents of which are incorporated herein by reference.

The invention claimed is:

1. A method for treating coal gasification wastewater containing selenium and ions of a metal nobler than titanium eluted from a noble metal catalyst in a catalytic wet oxidation treatment using the noble metal catalyst, said method comprising:
   a pretreatment process removing the ions of the metal nobler than titanium from the coal gasification wastewater; and
   a selenium reduction process contacting the coal gasification wastewater with a mixture/solution of metallic titanium and a simple metal baser than metallic titanium whereby a portion of the simple metal baser than metallic titanium is eluted, and the selenium in the coal gasification wastewater becomes reduced.

2. The method for treating coal gasification wastewater according to claim 1, wherein the simple metal baser than metallic titanium is at least one selected from the group consisting of zinc, aluminum, and magnesium.

3. The method for treating coal gasification wastewater according to claim 1, wherein in the pretreatment process, the ions of the metal nobler than titanium are removed by being reduced by another metal baser than titanium.

4. The method for treating coal gasification wastewater according to claim 3, wherein the pretreatment process is performed under acidic condition.

5. The method for treating coal gasification wastewater according to claim 1, wherein water obtained by the pretreatment process is added with an acid and is then subjected to the selenium reduction process.

6. The method for treating coal gasification wastewater according to claim 1, further comprising feeding the coal gasification wastewater in an upflow mode to a first pretreatment unit filled with base metal particles comprising aluminum and titanium to begin the pretreatment process, and to cause a reduction reaction with the ions of the metal nobler than titanium in the coal gasification wastewater.

7. An apparatus for treating coal gasification wastewater containing selenium and ions of a metal nobler than titanium eluted from a noble metal catalyst in a catalytic wet oxidation treatment using the noble metal catalyst, said apparatus comprising:
   a first feeder configured to feed the coal gasification wastewater,
   a pretreatment unit receiving the coal gasification wastewater from the first feeder, the pretreatment unit being filled with base metal particles comprising aluminum and titanium, configured to remove the ions of the metal nobler than titanium from the coal gasification wastewater, a reduction treatment unit connected to the pretreatment unit, configured to receive water treated in the pretreatment unit and reduce the selenium by contacting the coal gasification wastewater with a mixture/solution of metallic titanium and a simple metal baser than metallic titanium in a selenium reduction reaction whereby a portion of the simple metal baser than metallic titanium is eluted and the selenium becomes reduced, an acid addition unit configured to add acid to the pretreated water, a solid-liquid separation unit connected to the pretreatment unit, and a second feeder configured to feed washing water to the pretreatment unit to wash the metal nobler than titanium precipitated in the pretreatment unit to the solid-liquid separation unit, wherein the metal nobler than titanium is collected in the solid-liquid separation unit.

8. The method for treating coal gasification wastewater according to claim 6, further comprising adding acid to the coal gasification wastewater from which the ions of the metal nobler than titanium are removed before the selenium reduction process.

9. The method for treating coal gasification wastewater according to claim 8, further comprising suspending the feeding of the coal gasification wastewater to the first pretreatment unit at a predetermined timing, feeding washing water to the first unit thereby washing the metal nobler than titanium precipitated in the pretreatment process to a second pretreatment unit, and collecting the metal nobler than titanium in the second pretreatment unit.

10. The method for treating coal gasification wastewater according to claim 9, wherein the wastewater fed to the first pretreatment unit has a temperature of 40 to 90 C.°, a feed rate of $1\ h^{-1}$ to $50\ h^{-1}$ and pH of 1-4; and the wastewater fed to the second pretreatment unit has a temperature of 40 to 90 C.°, feed rate of $1\ h^{-1}$ to $20\ h^{-1}$ and an amount of acid added of $1\times10^{-3}$ N to $100\times10^{-3}$ N per 1 mg/L of selenium in a pretreated water.

* * * * *